(12) United States Patent
Simoneau

(10) Patent No.: US 7,183,507 B2
(45) Date of Patent: Feb. 27, 2007

(54) APPLIANCE HAVING A TIMER

(76) Inventor: Susan Simoneau, 62 Fleming St., Manchester, NH (US) 03104

( * ) Notice: Subject to any disclaimer, the term of this patent is extended or adjusted under 35 U.S.C. 154(b) by 0 days.

(21) Appl. No.: 11/038,796

(22) Filed: Jan. 20, 2005

(65) Prior Publication Data

US 2006/0157328 A1 Jul. 20, 2006

(51) Int. Cl.
H01H 7/08 (2006.01)

(52) U.S. Cl. .................. 200/38 R; 200/38 B

(58) Field of Classification Search .................. 200/33, 200/35, 38 B, 38 R, 317, 336, 564
See application file for complete search history.

(56) References Cited

U.S. PATENT DOCUMENTS

| 569,320 | A | * | 10/1896 | Wan | 209/286 |
|---|---|---|---|---|---|
| 3,288,951 | A | * | 11/1966 | Doyle et al. | 200/35 R |
| 3,288,953 | A | * | 11/1966 | Swanke | 200/35 R |
| 3,581,028 | A | * | 5/1971 | Valbona | 200/38 R |
| 4,330,702 | A | * | 5/1982 | Cheng | 219/492 |
| 4,345,145 | A | * | 8/1982 | Norwood | 219/492 |
| 4,566,802 | A | * | 1/1986 | Koehler | 368/9 |
| 4,822,172 | A | * | 4/1989 | Stottmann | 366/142 |
| 4,857,758 | A | * | 8/1989 | Rigazio et al. | 307/140 |
| 4,980,450 | A | * | 12/1990 | Brule et al. | 530/300 |
| 5,051,837 | A | * | 9/1991 | McJunkin | 725/26 |
| 5,438,726 | A | * | 8/1995 | Leite | 15/105 |
| 5,680,445 | A | * | 10/1997 | Bogner et al. | 379/106.01 |
| 6,111,240 | A | * | 8/2000 | Kishimoto et al. | 219/720 |
| 6,573,483 | B1 | * | 6/2003 | DeCobert et al. | 219/506 |
| 6,914,536 | B2 | * | 7/2005 | Gratkowski | 340/666 |
| 6,940,413 | B2 | * | 9/2005 | Longobardi | 340/635 |
| 2002/0014482 | A1 | * | 2/2002 | Becker et al. | 219/483 |

* cited by examiner

Primary Examiner—Michael Friedhofer
Assistant Examiner—Lisa Klaus
(74) Attorney, Agent, or Firm—Bourque and Associates

(57) ABSTRACT

A timer for an appliance is activated by the appliance user to display elapsed time on a time display device mounted on and/or integral with the appliance. The timer may be initialized by a separate initialization mechanism or simultaneously with the user activating the appliance itself. Examples of appliances include kitchen appliances such as hand mixers, counter-top mixers, choppers, grinders, and toothbrushes.

4 Claims, 4 Drawing Sheets

APPLIANCE HAVING A TIMER

TECHNICAL FIELD

The present invention relates generally to kitchen and other appliances and more particularly, to a timer for such an appliance.

BACKGROUND INFORMATION

Hand operated kitchen and other hand operated appliances such as mixers, food processors, and the like are well known. In use, the user moves or pushes a switch or button to activate the appliance or otherwise operates the appliance.

Many recipes, however, call for use of such an appliance for a pre-determined period of time. In order to accomplish this, the user has to either estimate the amount of time called for, use an auxiliary timer, count in his/her head, or use a wall clock to accomplish the timing. Often, however, these external devices are not available or alternatively the user may become distracted and lose track of time.

Accordingly, the need exist for an appliance having a built in timer on the appliance itself that is initialized either by separate action of the user or simultaneously along with energizing the appliance itself.

SUMMARY

The invention features a timer for an appliance, such as a kitchen or other hand operated appliance. Without limitation, examples of kitchen appliances include handheld mixers, countertop mixers, choppers, and grinders while examples of other hand appliances include toothbrushes and the like. In a first embodiment, the invention includes a time display element and a timer initialization element. In use, the user activates the timer by pushing or otherwise activating the initialization element that causes elapsed time to be displayed on the display element. The initialization element may also include a mechanism for resetting the timer to zero or some other predetermined value. In another embodiment, the timer may reset itself every time the initialization mechanism is activated.

In another embodiment, the initialization mechanism may be part of the mechanism that is used to activate the appliance. For example, depressing or moving an "on" switch may initialize the timer; as may the rotation and/or depression of a dial. In such an embodiment, the timer initializes automatically when the appliance is activated.

It is important to note that the present invention is not intended to be limited to a device or method which must satisfy one or more of any stated or implied objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
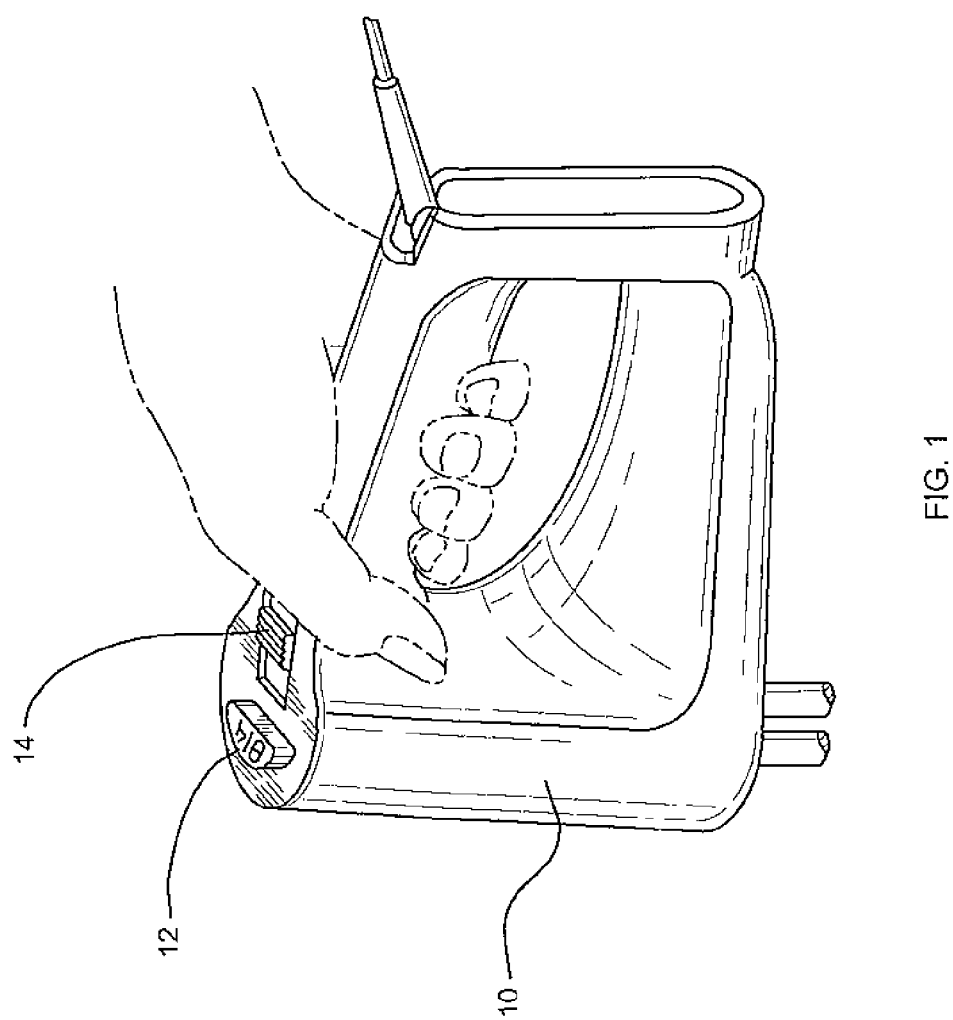
FIG. 1 is schematic perspective view of a kitchen appliance having a time display element according to the present invention.

The present invention features an appliance, such as a kitchen appliance 10, FIG. 1, incorporating a time display element 12 according to the present invention. In this embodiment, the time display mechanism may be reset and initialized by either depressing the time display element 12 itself or alternatively, by sliding or depressing the appliance activation element 14.

Figure 2A:
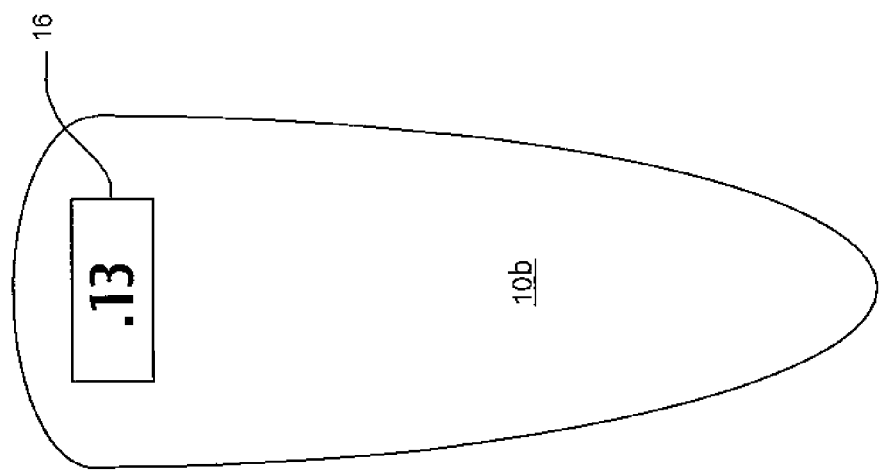
FIG. 2A is a top view of a kitchen appliance with a time display element and a timer initialization element.
Figure 2B:
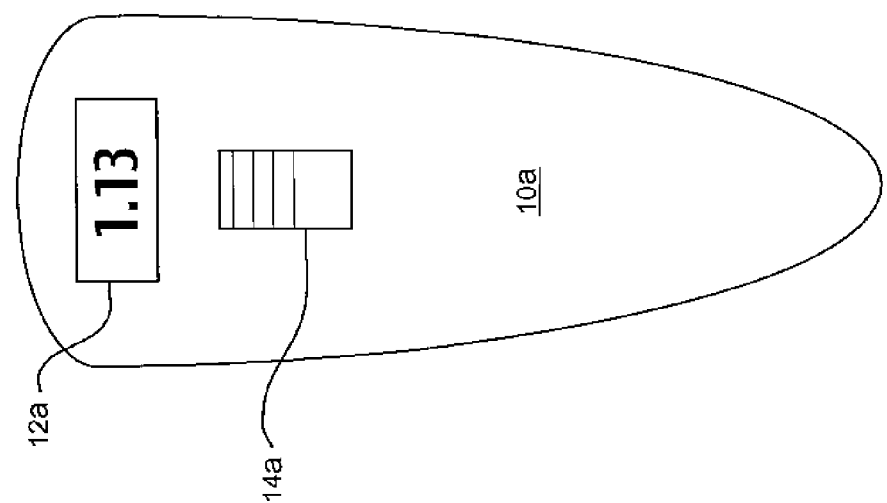
FIG. 2B is a top view of a kitchen appliance with combined time display element and timer initialization element in one device.

As shown in FIG. 2A, the appliance may include a time display element 12a that may be initialized and/or activated by depressing the time display element 12a itself. Alternatively, the time display element may be initialized and/or activated to continue to increment and display time by activation of the appliance activation element 14a. Alternatively, the appliance 10b may have only one element 16 that serves as a time display element, timer initialization element and appliance activation element. Such embodiments are within the skill level of one skilled in the art and at the discretion of the appliance designer and/or may be based on the type and/or style of the appliance.

Figure 3:
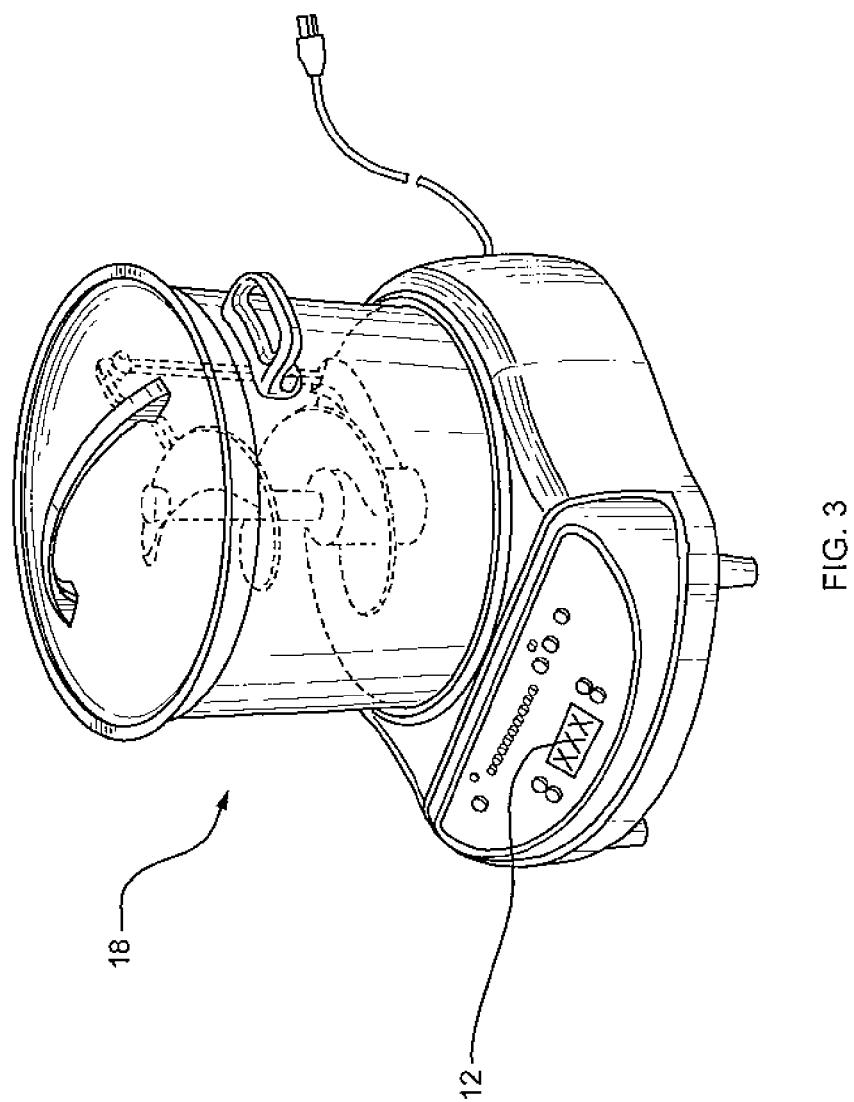
FIG. 3 is a front perspective schematic view of another embodiment of a kitchen appliance with a time display element according to the present invention.
Figure 4:
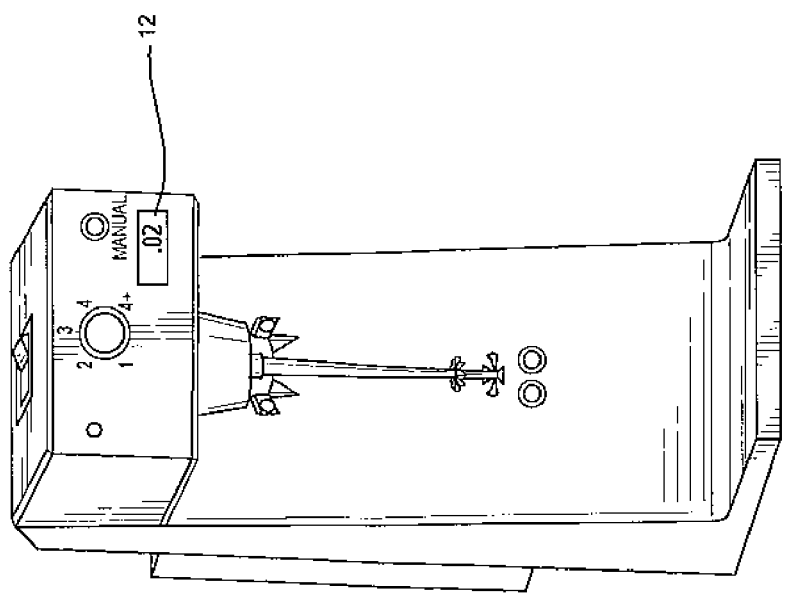
FIG. 4 is a front perspective schematic view of yet another embodiment of the time display element of the present invention incorporated on another appliance.

Other types of appliances on which the time display element 12 may be used include a kitchen food processor 18, FIG. 3 and a drink blender 20. Other appliances that might benefit from the present invention include, but are not limited to tooth brushes, coffee grinders, hand choppers and the like. The appliance need not be electric as the present invention may be implemented on battery operated appliance devices and hand or non-electric or non-battery operated devices by use of a mechanical timer element.

Accordingly, the present invention provides a novel and useful time display element on the appliance to allow users to accurately and easily time their use of the appliance.

As mentioned above, the present invention is not intended to be limited to a device or method which must satisfy one or more of any stated or implied objects or features of the invention and should not be limited to the preferred, exemplary, or primary embodiment(s) described herein. Modifications and substitutions by one of ordinary skill in the art are considered to be within the scope of the present invention, which is not to be limited except by the following claims.

The invention claimed is:

1. An appliance having an elapsed time timer comprising:
    an appliance;
    an elapsed time timer including a digital time display element, integral with said appliance and responsive to an elapsed time timer initializer of a user activatable appliance activation mechanism, and configured for being reset to zero and displaying elapsed time since a last initialization; and a user activatable appliance activation mechanism, integral with said appliance, said appliance including an elapsed time timer initializer, coupled to said elapsed time timer, said user activatable appliance activation mechanism configured, upon user activation, for activating said appliance and for simultaneously automatically resetting said elapsed time timer and said digital time display element, for initializing said elapsed time timer and for causing said digital time display element to begin displaying elapsed time since said timer initialization caused by said user activation of said user activatable appliance activation mechanism.

2. The applicance of claim 1 wherein said digital display element is selected from the group consisting of an LCD display and an LED display.

3. The applicance of claim 1 wherein said user activatable appliance activation mechanism is selected from the group consisting of a push button, a dial, and a rotary switch.

4. The applicance of claim 1 wherein said appliance is selected from the group consisting of a hand mixer, a counter-top mixer, a chopper, a toothbrush, and a grinder.

\* \* \* \* \*